United States Patent [19]

Curtis

[11] Patent Number: 4,841,756
[45] Date of Patent: Jun. 27, 1989

[54] LOCKING DEVICE FOR A SHAFT END, SUCH AS A TRAILER KINGPIN

[76] Inventor: William A. Curtis, 4817 Colony Church Rd., St. Louis, Mo. 63129

[21] Appl. No.: 257,978

[22] Filed: Oct. 14, 1988

[51] Int. Cl.$^4$ ............................................. F16B 41/00
[52] U.S. Cl. ........................................ 70/232; 70/417
[58] Field of Search .................. 70/229, 230, 231, 232, 70/417, 258; 280/507

[56] References Cited

U.S. PATENT DOCUMENTS

| | | | |
|---|---|---|---|
| 2,641,124 | 6/1953 | Gallagher | 70/232 |
| 3,415,085 | 12/1968 | Eble | 70/232 |
| 4,620,718 | 11/1986 | Mickelsa | 70/232 |

Primary Examiner—Robert L. Wolfe
Attorney, Agent, or Firm—Senniger, Powers, Leavitt & Roedel

[57] ABSTRACT

A locking device for use with a standard padlock of the type having a lock base and a generally U-shaped shackle, one leg of which is pivotally mounted in the base, the device comprising a body having an opening therein and a socket in the body for receiving the padlock, the socket intersecting the opening so that a portion of a padlock received in the socket protrudes into the opening. An engaging member is disposed in the socket for engaging the shackle of the padlock when the padlock is locked to retain the padlock in the socket, while allowing the padlock to be freely inserted and removed from the socket when the padlock is unlocked. The device preferably has a first camming surface on the engaging member for engaging the shackle of a padlock in the socket and adapted for pivoting the shackle of an unlocked padlock to clear the engaging member to permit withdrawal of an unlocked padlock from the socket; a second camming surface on the engaging member for pivoting the shackle of an unlocked padlock to clear the engaging member to permit the unlocked padlock to be inserted into the socket; and a third camming surface at the bottom of the socket for pivoting the shackle of an unlocked lock urged against it to bring the shackle back into locking orientation with the lock base and into position to engage the retaining means after the shackle has cleared the retaining means.

17 Claims, 2 Drawing Sheets

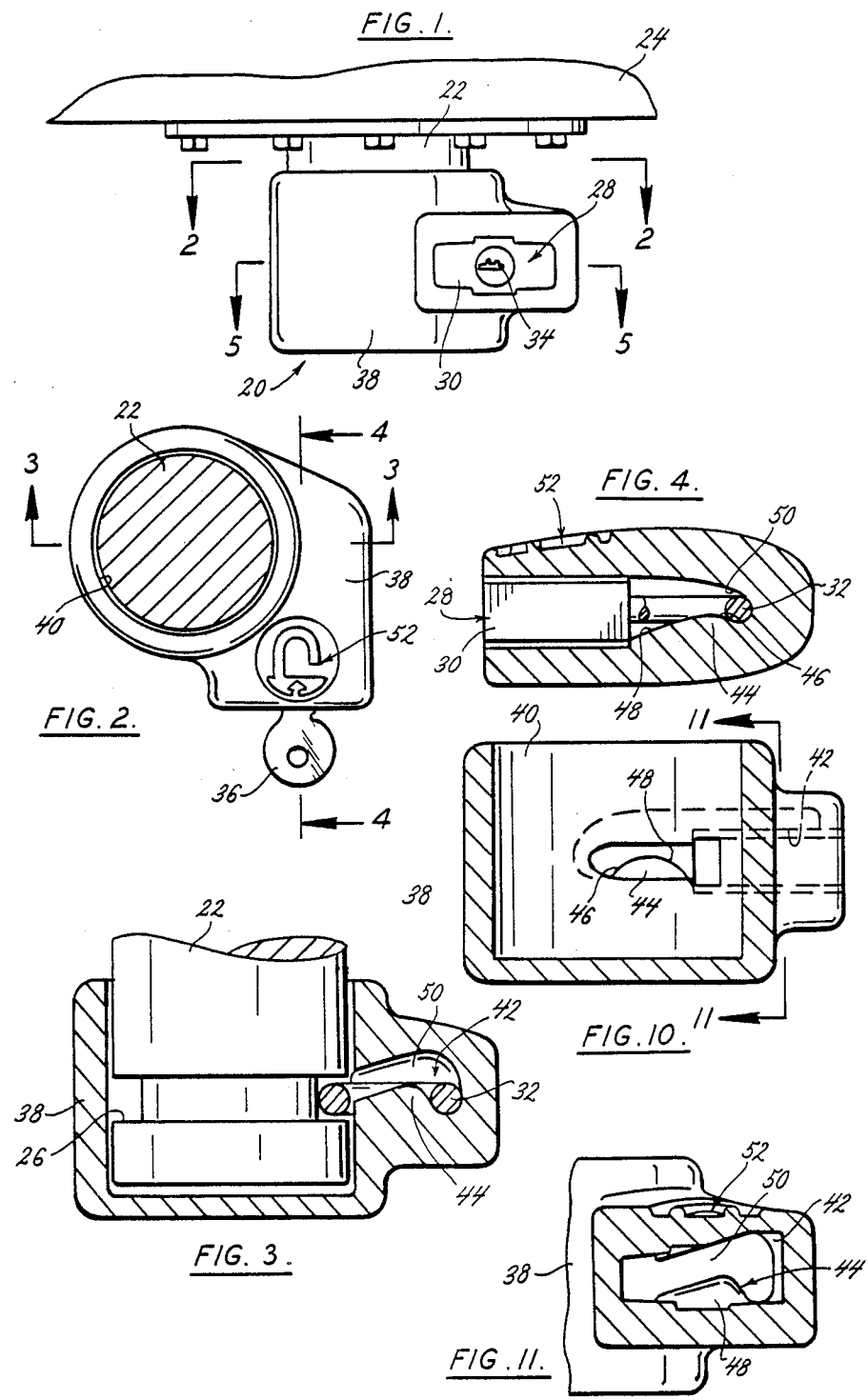

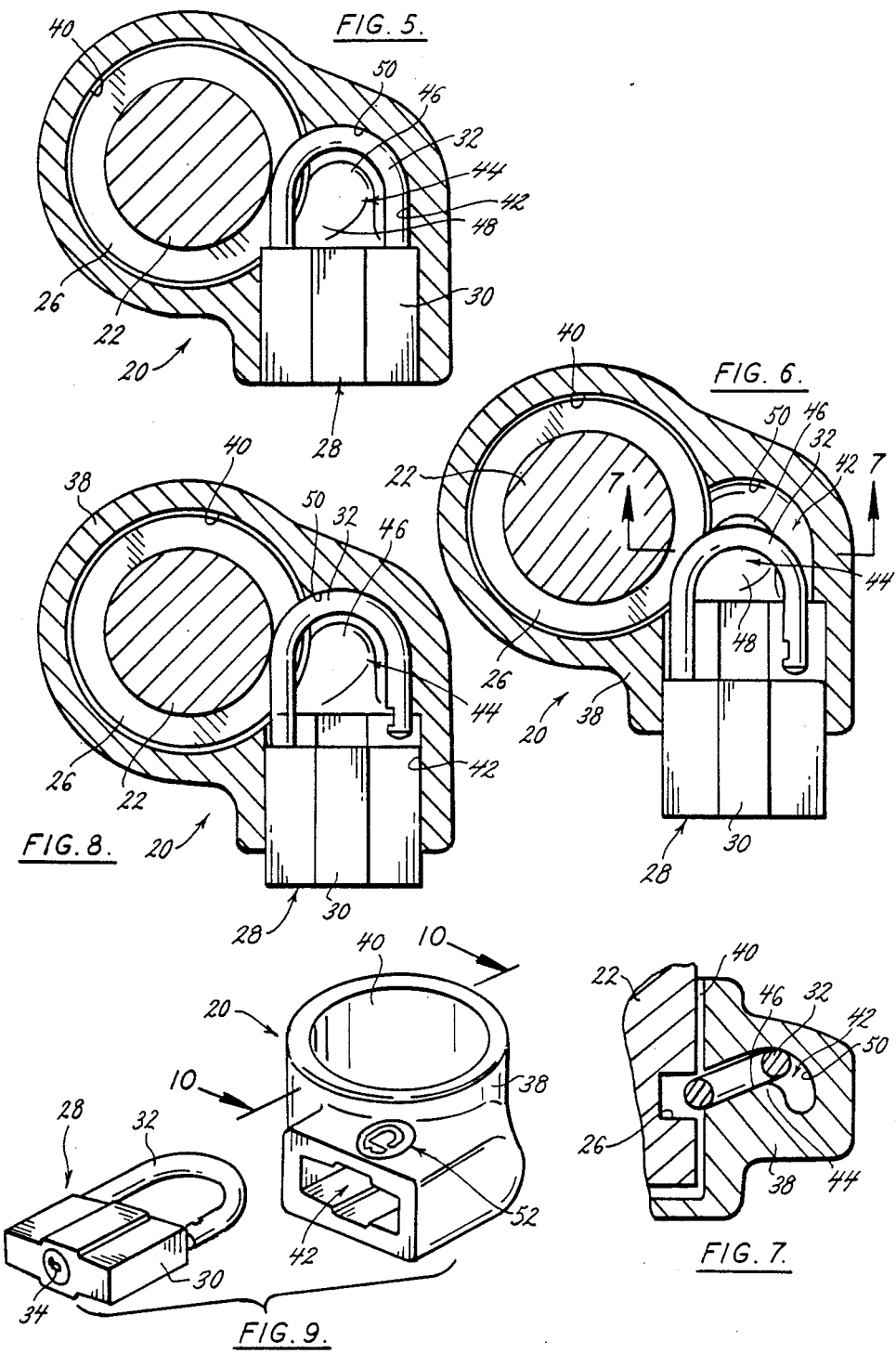

LOCKING DEVICE FOR A SHAFT END, SUCH AS A TRAILER KINGPIN

BACKGROUND OF THE INVENTION

This invention relates to locks, and in particular to a locking device for a shaft end, such as the kingpin of a trailer.

Truck trailers generally have a kingbolt or kingpin depending from their forward end that can be engaged and pulled by a tractor. Various locking devices have been made to be releasably secured over the end of the kingpin to resist theft of the trailer by preventing unauthorized persons from connecting the trailer kingpin to a tractor. These devices have typically been large, cumbersome, difficult to install and remove, and expensive.

SUMMARY OF THE INVENTION

It is among the objects of the present invention to provide a locking device adapted to be releasably secured over the end of a shaft, such as the end of a trailer kingpin; to provide such a device that is of compact and simple construction for easy handling and storage; to provide such a device that can be used with a standard padlock; to provide such a device that can be quickly and easily installed and removed; and to provide such a device that can be inexpensively made, such as by casting.

The locking device of the present invention is adapted to be releasably secured over the end of a shaft, such as the kingpin of a trailer, with a standard padlock of the type comprising a base and a generally U-shaped shackle. The device generally comprises a body having a cup therein for receiving the end of the shaft. There is a socket in the body for receiving the padlock. The socket intersects the cup so that a portion of a padlock received in the socket protrudes into the cup to engage the shaft. The device further comprises retaining means in the socket for engaging the shackle of a locked padlock received in the socket to retain the locked padlock in the socket, while allowing an unlocked padlock to be freely inserted and withdrawn from the socket.

The retaining means preferably comprises an engaging member in the socket for engaging the shackle of a locked padlock, the engaging member having a first camming surface to pivot the shackle of an unlocked padlock to clear the engaging member and permit withdrawal of the unlocked padlock from the socket. The device also includes means, such as a second camming surface, for pivoting the shackle of an unlocked padlock to clear the engaging member as the unlocked padlock is inserted to socket, and means, such as a third camming surface, for pivoting the shackle of the unlocked padlock to bring the shackle back into locking orientation with the base and into position to engage the engaging member after the shackle has cleared the engaging member.

The device is of extremely compact and simple construction, comprising just one piece in the preferred embodiment. In addition to facilitating storage and handling this construction allows the device to be inexpensively made, for example by casting. The device is adapted for use with a standard padlock, and thus the lock can be easily and inexpensively changed by simply replacing the padlock. The device closely conforms to and completely surrounds the padlock to protect the padlock and resist opening. The device is extremely easy is to install. A unlocked padlock is simply inserted into the socket to engage a shaft received in the cup. The padlock is then locked to secure the locking device over the end of the shaft. The engaging means retains the locked padlock in the socket. The device is easily removed by unlocking the padlock and withdrawing the lock from the socket to remove the device from the end of the shaft.

These and other advantages will be in part apparent and in part pointed out hereinafter.

BRIEF DESCRIPTION OF THE DRAWINGS

FIG. 1 is a front elevation view of a locking device constructed according to the principles of this invention, shown as it would be secured over the end of the kingpin of a trailer;

FIG. 2 is cross-sectional view transversely through the kingpin, taken along the plane of line 2—2 in FIG. 1;

FIG. 3 is a cross-sectional view of the device taken along the plane of line 3—3 in FIG. 2, through the cup for receiving the kingpin and transversely through the socket for receiving the padlock;

FIG. 4 is a cross-sectional view of the device taken along the plane of line 4—4 in FIG. 2, longitudinally through the socket for receiving the padlock;

FIG. 5 is a cross-sectional view of the device taken along the plane of line 5—5 in FIG. 1, showing the padlock locked in the device;

FIG. 6 is a cross-sectional view of the device taken generally along the same plane as FIG. 5, showing the shackle of the unlocked padlock as it would appear as the padlock is inserted into the socket;

FIG. 7 is a partial cross sectional view of the device, taken along the plane of line 7—7 in FIG. 6, transversely through the socket;

FIG. 8 is a cross-sectional view of the device taken generally along the same plane as FIG. 5, showing the shackle of the unlocked padlock as it would appear after clearing the engaging member;

FIG. 9 is a perspective view of the device and the padlock;

FIG. 10 is a cross-sectional view of the device taken along the plane of line 10—10 in FIG. 9, through the cup for receiving the kingpin, showing the intersection of the socket and the cup; and FIG. 11 is a partial cross-sectional view of the device taken along the plane of line 11—11 in FIG. 10, transversely through the socket, showing the engaging member.

Corresponding reference numerals indicate corresponding parts throughout the several views of the drawings.

DETAILED DESCRIPTION OF THE PREFERRED EMBODIMENT

The locking device of the present invention is adapted to be releasable secured over the end of a shaft, such as the kingpin of a truck trailer, with a standard padlock. A locking device constructed according to the principles of this invention, indicated generally as 20 in the Figures, is shown in FIG. 1 as it would be secured over the end of a kingpin 22 depending from the front end of a truck trailer 24. As best shown in FIG. 3, the kingpin 22 is generally cylindrical, and has a circumferential groove 26 therein, by which the device 20 may be secured to the kingpin 22. Although the locking device 20 is described with regard to kingpin 22, the invention is not so limited and the device 20 may be secured to the end of any shaft or similar member having a circumferential groove or similar structure by which the device can be secured to the shaft.

As noted above, the locking device 20 is adapted for use in conjunction with a standard padlock 28 (see e.g. FIG. 9). The padlock 28 is of the type comprising a lock base 30 and a generally U-shaped shackle 32. As is well known in the art one leg of the "U" is pivotally mounted in the lock base 30, and the other, "free" end of the shackle 32 can be aligned in locking orientation with the lock base 30, and inserted therein and locked. There is a key hole 34 (FIG. 1) in the bottom of padlock 28 adapted to receive a key 36 (FIG. 2) to operate the lock and release the free end of the shackle 32 and allow the shackle to pivot.

The device 20 comprises a body 38 which is preferably cast from a ductile iron, or other metal including steel, stainless steel, or aluminum. The top of the body 38 is preferably rounded to resist engagement by tools or other implements. The body 38 has a cup 40 therein for receiving the end of the kingpin 22. The cup 40 is preferably sized to closely conform to the kingpin 22 so that tools or other implements cannot be wedged between the device 20 and the kingpin 22. The body 38 also has a socket 42 for receiving the padlock 28. As best shown in FIGS. 5, 6, and 8, the socket 42 intersects the cup 40 so that a portion of the shackle 32 of the padlock 28 received in the socket 42 protrudes into the cup 40 to engage the groove 26 in the kingpin 22. The socket 42 preferably extends generally perpendicular to the axis of the cup 40 and tangentially intersects the cup.

The device 20 also includes retaining means for engaging the shackle 32 of the padlock 28 when the padlock is locked, in order to retain the locked padlock 28 in the socket 42, while allowing the padlock 28 to be freely inserted and removed from the socket 42 when it is unlocked. The retaining means comprises an engaging member 44 in the socket 42 that engages the shackle 32 of the padlock 28 when the padlock 28 is locked in order to resist the withdrawal of the locked padlock 28 from the socket 42. The engaging member 44 preferably has a first camming surface 46 to pivot the shackle of an unlocked padlock to clear the engaging member 44, thereby permitting withdrawal of an unlocked padlock from the socket 42. The first camming surface 46 is located on the inner face of the engaging member 44, facing the bottom of the socket 40. When the padlock 28 is unlocked, the shackle 32 can freely pivot when urged against the first camming surface 46, and thus the padlock 28 can be removed from the socket 42. However, when the padlock 28 is locked, the shackle 32 cannot pivot when urged against the first camming surface 46 and thus the first camming surface retains the padlock 28 in the socket 42.

The locking device 20 also comprises means for pivoting the shackle 32 of an unlocked padlock 28 to clear the engaging member 44 as the unlocked padlock is inserted into socket 42, and means for pivoting the shackle 32 of an unlocked padlock to bring the shackle 32 back into locking orientation with the lock base 30 and into position to engage the engaging member 44 after the shackle 32 has cleared the engaging member 44. The means for pivoting the shackle 32 of an unlocked padlock 28 to clear the engaging member 44 comprises a second camming surface 48 on the front face of the engaging member, generally facing the opening of the socket. The second camming surface 48 is adapted to pivot the shackle 32 of the unlocked padlock 28 as the shackle 32 is urged against it as an unlocked padlock is inserted into the socket. The means for pivoting the shackle 32 of the unlocked padlock after the shackle 32 has cleared the engaging member 44 comprises a third camming surface 50 at the bottom of the socket 42 adapted to pivot the shackle 32 of the unlocked padlock as the shackle is urged against it as the unlocked padlock in inserted into the socket.

The socket 42 is preferably sized to enclose all of the padlock 28 (when it is locked) so that the sides of the lock base 30 are not accessible, and the only exposed portion of the lock is the bottom of the base having the keyhole 32. The cross-section of socket 42 is preferably sized and shaped to closely conform to the lock base 30, so that the padlock 28 is securely held in socket 42, and there is no room for tools or other implements to access the padlock. Thus when the padlock 28 is locked in the socket it is completely and securely contained within the locking device, and is consequently extremely resistant to tampering.

The camming surfaces allow an unlocked lock to be freely inserted and withdrawn from the socket 42, but the engaging member 44 prevents the withdrawal of a locked padlock 28 by engaging the shackle 32 of the locked padlock 28. A pictogram 52 may be provided on the body 38 to indicate the proper manner of insertion of the padlock 28 in socket 42.

OPERATION

The locking device 20 is quickly and easily installed on the end of kingpin 22 or other shaft by placing the end of the kingpin 22 in the cup 40. The unlocked padlock 28 is then simply inserted into socket 40. As the unlocked padlock 28 is advanced in the socket 42, the shackle 32 engages the second camming surface 48 on the engaging member 44. (See FIGS. 6 and 7). The second camming surface 48 causes the shackle 32 to pivot so that the shackle 32 can clear the engaging member 44. (See FIG. 7). As the padlock 28 continues to be inserted into the socket 42, the shackle 32 clears the engaging member 44. Once the shackle 32 clears the engaging member 44, the shackle 32 continues to move inwardly toward the bottom of the socket 42 as the padlock 28 is inserted into the socket 42. The shackle 32 reaches the bottom of the socket 42 (FIG. 8) and engages third camming surface 50, which pivots the shackle 32 back into locking alignment with the base 30 of the padlock 38 and back into position to engage engaging member 44. The shackle 32 is then engaged by the bottom of the socket 42, and further insertion of the padlock 38 causes the base 30 to move relative to the shackle 32 until the free end of the shackle 32 is received and locked in the lock base 30 (FIG. 5). At this point, at least a portion of the shackle 32 protrudes into the cup 40, and into groove 26 in the kingpin 22 received in the cup. The shackle 32 thus retains the kingpin 22 in the cup 40.

As shown in FIGS. 4 and 5, when the padlock 28 is locked, the entire base 30 is contained within the socket 42, and the walls of the socket 42 closely surround the base 30 so that the only portion of the base 30 that is exposed is the bottom of the lock having the keyhole 32. This makes it difficult to tamper with or open the padlock 28, except with the key 34. Once the padlock 28 is locked, the shackle 32 is secured against further pivoting and the first camming surface 46 of the engaging member 44 engages the shackle 32 and retains the locked padlock 28 in the socket 42.

However, when the padlock 28 is unlocked, a portion of the base 30 of the padlock 28 will again protrude from the socket 42 (see FIG. 8), and this portion can be grasped to withdraw the padlock 28 from the socket 42. As the padlock 28 is withdrawn, the shackle 32 is urged against the first camming surface 46. Since the padlock 28 is unlocked, the shackle 32 can pivot, and the first camming surface 46 causes the shackle 32 to pivot to clear the engaging member 44 so that the padlock 28 can be withdrawn. Once the padlock is withdrawn from the socket, the device 20 can be removed from the kingpin 22.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A locking device for use with a standard padlock of the type having a lock base and a generally U-shaped shackle, one leg of which is pivotally mounted in the base, the device comprising:
   a body having an opening therein;
   a socket in the body for receiving the padlock, the socket intersecting the opening so that a portion of a padlock received in the socket protrudes into the opening;
   retaining means in the socket for engaging the shackle of the padlock when the padlock is locked to retain the padlock in the socket, while allowing the padlock to be freely inserted and removed from the socket when the padlock is unlocked; and
   means for pivoting the shackle of an unlocked padlock to clear the retaining means as the unlocked padlock is inserted to socket, and means for pivoting the shackle of an unlocked padlock to bring the shackle back into locking orientation with the lock base and into position to engage the retaining means after the shackle has cleared the retaining means.

2. A locking device for use with a standard padlock of the type having a lock base and a generally U-shaped shackle, one leg of which is pivotally mounted in the base, the device comprising:
   a body having an opening therein;
   a socket in the body for receiving the padlock, the socket intersecting the opening so that a portion of a padlock received in the socket protrudes into the opening; and
   retaining means comprising an engaging member in the socket for engaging the shackle of the padlock when the padlock is locked to resist withdrawal of the locked padlock from the socket, the engaging member having a camming surface to pivot the shackle when the padlock is unlocked to clear the engaging member to permit withdrawal of the unlocked padlock from the socket.

3. The locking device according to claim 2 further comprising means for pivoting the shackle of an unlocked padlock to clear the engaging member as the unlocked padlock is inserted to socket, and means for pivoting the shackle of the unlocked padlock to bring the shackle back into locking orientation with the lock base and into position to engage the engaging member after the shackle has cleared the engaging member.

4. The locking device according to claim 3 wherein the means for pivoting the shackle of the unlocked padlock to clear the engaging member comprises a camming surface on the front of the engaging member adapted to turn the shackle of an unlocked padlock as the shackle is urged against it upon insertion of the unlocked padlock into the socket.

5. The locking device according to claim 3 wherein the means for pivoting the shackle of the unlocked padlock after the shackle has cleared the engaging member comprises a camming surface at the bottom of the socket adapted to pivot the shackle of an unlocked padlock as the shackle is urged against it upon insertion of the unlocked padlock into the socket.

6. The locking device according to claim 2 wherein the socket is sized to completely contain the padlock when the padlock is locked.

7. The locking device according to claim 2 wherein the cross-section of the socket closely conforms to the base of the padlock.

8. The locking device according to claim 2 wherein the opening comprises a cup adapted to receive the end of a shaft, such as a kingpin.

9. The locking device according to claim 2 wherein the device is cast.

10. A locking device adapted to be releasably secured over the end of a shaft, such as the kingpin of a truck trailer, with a standard padlock of the type having a lock base and a generally U-shaped shackle, one leg of which is pivotally mounted to the base, the device comprising:
    a body having a cup therein for receiving the end of the shaft;
    a socket in the body for receiving the padlock, the socket extending generally perpendicular to the axis of the cup and tangentially intercepting the cup so that a portion of a padlock received in the socket protrudes into the cup to engage the shaft;
    an engaging member in the socket for engaging the shackle of a locked padlock received in the socket to retain the locked padlock in the socket, the engaging member including camming means for pivoting the shackle of an unlocked padlock urged against the camming means to clear the engaging member to permit withdrawal of an unlocked padlock from the socket;
    means for pivoting the shackle of an unlocked padlock being inserted into the socket to clear the engaging member as the padlock is inserted to socket; and
    means for pivoting the shackle of the unlocked padlock being inserted into the socket to bring the shackle back into locking orientation with the lock base and into position to engage the engaging member after the shackle has cleared the engaging member.

11. The locking device according to claim 10 wherein the means for pivoting the shackle to clear the engaging member comprises a camming surface adapted to pivot the shackle as the shackle is urged against it upon insertion of the padlock into the socket.

12. The locking device according to claim 10 wherein the means for pivoting the shackle after the shackle has cleared the engaging member comprises a camming surface at the bottom of the socket adapted to turn the shackle as the shackle is urged against it upon insertion of the padlock into the socket.

13. The locking device according to claim 10 wherein the socket is sized to completely contain the padlock when the padlock is locked.

14. The locking device according to claim 10 wherein the cross-section of the socket closely conforms to the base of the padlock.

15. A locking device adapted to be releasably secured over the end of a shaft, such as the kingpin of a truck trailer, with a standard padlock of the type having a lock base and a generally U-shaped shackle, one leg of which is pivotally mounted in the base, the device comprising:

a body having a cup therein for receiving the end of the shaft;

a socket in the body for receiving the padlock, the socket extending into the body generally perpendicular to the axis of the cup and tangentially intersecting the cup so that a portion of the padlock received in the socket protrudes into the cup to engage the shaft, the socket adapted to closely conform to and surround the padlock;

an engaging member in the socket for engaging the shackle of a locked padlock received in the socket to retain the locked padlock in the socket, the engaging member having a first camming surface facing inwardly toward the bottom of the socket for engaging the shackle of a padlock in the socket, the first camming surface adapted for pivoting the shackle of an unlocked lock to clear the engaging member to permit withdrawal of an unlocked padlock from the socket, and a second camming surface facing outwardly toward the socket opening for turning the shackle of an unlocked padlock to clear the engaging member to permit the unlocked padlock to be inserted into the socket; and a third camming surface at the bottom of the socket for pivoting the shackle of an unlocked lock urged against it during insertion of the lock into the socket after the shackle has cleared the retaining means to bring the shackle back into locking orientation with the lock base and into position to engage the retaining means.

16. The locking device according to claim 15 wherein the body is cast.

17. A locking device adapted to be releasably secured over the end of a shaft, such as the kingpin of a truck trailer, with a standard padlock of the type having a lock base and a generally U-shaped shackle, one leg of which is pivotally mounted in the base, the device comprising:

a body having a cup therein for receiving the end of the shaft;

a socket in the body for receiving the padlock, the socket extending into the body generally perpendicular to the axis of the cup and tangentially intersecting the cup so that a portion of the padlock received in the socket protrudes into the cup to engage the shaft, the socket adapted to closely conform to and surround the padlock;

an engaging member in the socket for engaging the shackle of a locked padlock received in the socket to resist withdrawal of the locked padlock from the socket;

a first camming surface on the engaging member facing inwardly toward the bottom of the socket for engaging the shackle of a padlock in the socket, the first camming surface adapted for pivoting the shackle or an unlocked padlock to clear the engaging member to permit withdrawal of an unlocked padlock from the socket;

a second camming surface on the engaging member facing outwardly toward the opening of the socket for pivoting the shackle of an unlocked padlock to clear the engaging member to permit the unlocked padlock to be inserted into the socket; and a third camming surface at the bottom of the socket for pivoting the shackle of an unlocked lock urged against it to bring the shackle back into locking orientation with the lock base and into position to engage the retaining means after the shackle has cleared the retaining means;

whereby the second camming surface will pivot the shackle of an unlocked padlock being inserted into the socket to clear the engaging member and the third camming surface will pivot the shackle back into locking orientation with the padlock base and into position to engage the retaining member after the shackle has cleared the engaging member, so that the padlock can be locked inside of the socket and retained therein by the engaging member, and whereby the first camming surface will engage the shackle of a locked padlock in the socket to retain a locked padlock in the socket, and will pivot the shackle of an unlocked padlock being removed from the socket to allow the shackle to clear the engaging means to allow an unlocked padlock to be removed from the socket.

* * * * *